United States Patent [19]

Staut et al.

[11] 3,833,390

[45] Sept. 3, 1974

[54] DEVELOPMENT OF HOT STRENGTH IN SYNTHETIC MAGNESIA REFRACTORIES HAVING HIGH $B_2O_3$ CONTENT

[75] Inventors: Ronald Staut, Cherry Hill, N.J.; Gunther L. Mortl, Villach, Austria

[73] Assignee: General Refractories Company, Philadelphia, Pa.

[22] Filed: Aug. 19, 1971

[21] Appl. No.: 173,302

[52] U.S. Cl. .................................................. 106/58
[51] Int. Cl. ........................................... C04b 35/04
[58] Field of Search .......... 106/58; 23/201; 423/156, 423/160, 162

[56] References Cited
UNITED STATES PATENTS

| | | | |
|---|---|---|---|
| 3,275,461 | 9/1966 | Davies et al. ......................... | 106/58 |
| 3,582,373 | 6/1971 | Gilpin et al. ......................... | 106/58 |
| 3,715,222 | 2/1973 | Hieb .................................... | 106/58 |

Primary Examiner—Delbert E. Gantz
Assistant Examiner—S. Berger
Attorney, Agent, or Firm—Finnegan, Henderson, Farabow & Garrett

[57] ABSTRACT

A magnesia refractory shape possessing good strength properties at elevated temperatures is prepared from a magnesia grain containing 90 to 99% MgO, and over 0.1% by weight $B_2O_3$; and which can have a Ca-Si mole ratio of less than 2.0. Fine particles of an alkali metal-containing compound are added to the magnesia grain to help volatilize the boron during firing. Fine particles of calcium-and silicon-containing material can be admixed, if needed, with the magnesia grain to increase the Ca-Si mole ratio of the fine (−100 mesh) particles of the admixture to above 2:1 and to increase the total weight percent of CaO and $SiO_2$ present in the fine particle component of the composition to between 3 to 7% by weight.

7 Claims, No Drawings

DEVELOPMENT OF HOT STRENGTH IN SYNTHETIC MAGNESIA REFRACTORIES HAVING HIGH $B_2O_3$ CONTENT

This invention relates to a process for producing magnesia refractory shapes. More particularly, the invention relates to the production of magnesia refractory materials which exhibit superior hot strength properties.

It has been found that an excellent correlation exists between good hot strength characteristics and increased service life for basic refractories used in basic oxygen steel furnaces. Thus, the use of basic oxygen steel furnaces by steel companies has created a substantially increased demand for basic refractories having improved hot strength properties.

Refractory materials used in basic oxygen steel furnaces typically contain oxides of magnesium and calcium along with small amounts of the oxides of silicon, boron, iron and aluminum. Refractories which contain a relatively high percentage of calcium oxide tend to hydrate on exposure to air. Because of their reduced tendency to hydrate, high magnesia content refractories, containing for example 96–98% MgO and relatively low amounts of calcium oxide, possess an inherently longer storage life than compositions containing a higher percentage of calcium oxide.

At the present time, high hot strength magnesia refractory compositions are conventionally made with a low flux magnesia grain having a $B_2O_3$ content less than 0.1% and preferably less than 0.05%, and with a $CaO/SiO_2$ mole ratio in the range of 2:1. The use of such a magnesia grain as a starting material is desirable because the presence of more than 0.05% by weight of $B_2O_3$ is detrimental to the hot strength of synthetic magnesia compositions and because $CaO/SiO_2$ mole ratios of about 2:1 promote the formation of dicalcium silicate, a material with good refractory properties that forms into isolated pockets rather than a continuous matrix when fired as part of a mix containing over 90% MgO. Thus, in a high purity fired magnesia composition, the presence of dicalcium silicate will promote particle to particle contact between MgO particles, a relationship that results in good hot strength since there is no flux between the load bearing particles to melt and create a weak spot at elevated temperatures.

It has now been found in accordance with the present invention, that a grain containing a high percentage of MgO, a relatively high $B_2O_3$ content (greater than 0.1%), and a range of $CaO/SiO_2$ mole ratios including a relatively low $CaO/SiO_2$ ratio, for example below about 2 to 1, can be processed to yield a high hot strength refractory material.

The invention thus provides an improved process of preparing a magnesia refractory material possessing good strength properties at elevated temperatures. Specifically, the process comprises admixing fine particles of an alkali metal-containing compound with a low $Fe_2O_3$ and $Al_2O_3$ content magnesia grain starting material, containing 90 to 99% of MgO and over 0.1% by weight $B_2O_3$, and firing the admixture to volatilize the alkali metal compound and the boron.

For reasons of economy and ready commercial availability, the starting material preferably has a Ca-Si mole ratio of less than 2.0, and fine particles of calcium and silicon-containig compounds are admixed with the magnesia starting material to increase the $CaO-SiO_2$ mole ratio of the fine particle component of the composition to at least 2.0 and to increase the aggregate weight percent of Ca and Si, on an oxide basis, to between 3 to 7% by weight of the fine particle component of the composition.

Unexpectedly, a brick or other refractory product produced from a high-boron-content magnesia grain in accordance with the process of the invention is almost indistinguishable from a similar refractory product produced from a more expensive, low-boron-content magnesia grain. After firing, there is almost no trace of the alkali metal compound, and the boron content can generally be reduced to a level comparable to that of the usual commercially available so-called low boron magnesia grains. The strength properties of the fired refractory products produced by the invention are excellent, and do not appear to be adversely affected by the volatilization of the alkali metal and boron during the firing step.

Magnesia starting materials having a $B_2O_3$ content above 0.1% by weight and a low $CaO/SiO_2$ ratio, such as conventionally utilized in direct bonded refractories, can in accordance with the invention be used in preparing refractory shapes for basic oxygen steel furnaces. Prior to the present invention, two types of magnesia starting materials had to be stockpiled by refractory manufacturers, one a relatively expensive low $B_2O_3$ grain containing about 0.02% of boron on an oxide basis and having a $CaO/SiO_2$ ratio of about 2:1 for use in basic oxygen furnaces, and the other a less expensive magnesia starting grain for bonded refractories having a $CaO/SiO_2$ ratio of about 1:1, and containing considerably higher percentages of $B_2O_3$. Now the latter starting material can be used for both purposes with considerable cost savings.

The elimination of the need for a low $B_2O_3$ starting material permits using a less expensive starting material, results in production cost savings with respect to inventory requirements, and also eliminates contamination in magnesia grinding systems, and the cleaning cost involved in changing over from one magnesia grain to another.

The invention resides in the novel process, products, compositions, and improvements shown and described. Both the foregoing general description and the following detailed description are exemplary, and should not be considered to restrict the scope of the invention.

Magnesia refractories can be produced according to the present invention from a variety of commercially available synthetic magnesia grains. The invention is particularly well adapted to the use of a starting magnesia grain containing 90 to 99% MgO and over 0.1% by weight $B_2O_3$, and having a CaO to $SiO_2$ mole ratio less than 2.0. Such a synthetic magnesia grain is commonly available and is conventionally utilized in direct bonded refractories designed for less severe environments than basic oxygen steel furnaces. The chemical composition of a typical starting magnesia grain, in percent by weight, is 0.58% $SiO_2$; 0.30% $Fe_2O_3$; 0.23% $Al_2O_3$; 0.75% CaO; 97.8% MgO; 0.14% $B_2O_3$; and volatiles lost on ignition 0.19%.

The batch mix used in the present process should contain a blend of particle sizes that will give a closely packed mass. Preferably, the batch mix used in forming a refractory brick in accordance with the process of the invention contains the particles of the three usual size classifications and weight percentages: 25–40% coarse; 25–40% intermediate; and 25–40% fines of −100 mesh.

In accordance with the invention, an alkali-metal containing compound is added to the magnesia starting material to help volatilize the boron present in the magnesia grain. The alkali metal containing compound should be an oxide, or a compound which is readily converted to the oxide form upon firing, such as a nitrate, a carbonate, or a hydroxide. Typical alkali metal-containing compounds which can be used in the present invention include KOH, NaOH, $K_2CO_3$, $Na_2CO_3$, $KNO_3$, $NaNO_3$, $K_2O$, $Na_2O$, and the corresponding lithium compounds.

The amount of alkali metal-containing compound which is admixed with the starting magnesia grain should be sufficient to reduce the $B_2O_3$ content of the fired composition to below 0.05% by weight, usually the alkali metal compound is added in amounts to provide 0.2–1% and preferably 0.4–0.6% by weight of alkali metal on an oxide basis in the admixed composition. Preferably, the alkali metal compound is in finely divided form because uniform distribution of the alkali metal throughout the composition helps promote uniform volatilization of boron from the composition during firing.

If the magnesia grain selected as a starting material has a CaO to $SiO_2$ mole ratio of less 2.0 with respect to its fines component (particles below 100 mesh) or, if the total CaO + $SiO_2$ content of the fine fraction is below 3%, then it is desirable to admix with the starting material fine particles of calcium and/or silicon-containing compounds to achieve these values. The Ca/Si mole ratio of the fines and the overall weight percent of CaO and $SiO_2$ present in the fines, must be equal to or above these values to obtain high hot strength properties in the resultant refractory product.

The calcium and/or silicon-containing compounds can be added either before or after the addition of the alkali metal-containing material. The silica matrix of the composition, after firing, contains CaO and $SiO_2$ in a mole ratio of 2 to 1 to 5 to 1, preferably 2 to 1 to 3 to 1, and in an aggregate amount equal to 3 to 7% by weight of the original fines, preferably 3.5–5.5%.

A wide variety of calcium and/or silicon-containing compounds can be utilized to increase the CaO/$SiO_2$ mole ratio and the weight percent of these compounds in the refractory compositions. Suitable sources of silica include wollastonite ($CaSiO_3$), serpentine, diopside and $SiO_2$ or high $SiO_2$ containing magnesias. Suitable sources of CaO include wollastonite, calcium carbonate, calcium hydroxide, dolomite, calcium nitrate, and high CaO containing magnesias.

The alkali metal-containing compound and the calcium- and silicon-containing compounds can be conveniently added to the magnesia starting grain in a suitable mixer. After the addition of the alkali metal compound, and if necessary the silicon and calcium compounds as set forth above, the resulting admixture is formed into the desired shape by any practical method of consolidation such as tamping, camming, vibratory compaction or by pressing. Pressures of about 5,000 to 20,000 psi are usually used to obtain the desired pressed densities. After forming, the refractory shapes are fired at temperatures of from 2800 to 3200°F for from 1 to 10 hours. Preferred firing temperatures range from 3000 to 3200°F.

The refractory materials produced by the present process possess desirable hot strength properties and comprise after firing 90 to 98% by weight of MgO in the form of tightly packed MgO particles predominantly in particle-to-particle contact. A discontinuous silica-containing phase comprises isolated pockets of $Ca_2S$. The hot crushing strengths of refractory articles of this invention are generally above 4500 psi, and frequently many test greater than 5000 psi.

For a better understanding of the invention, the following examples are provided. These examples are intended to be illustrative and should not be construed as limiting the invention. All parts and percentages listed in the specification and claims are by weight unless otherwise noted. All screen mesh designations are U.S. Standard Screen unless otherwise noted.

EXAMPLES 1–22

These examples show how high hot strength can be achieved with a starting material comprising a magnesia grain having a low CaO/$SiO_2$ mole ratio and containing a high weight percent of boron (over 0.1%). The chemical composition of the starting magnesia grain in weight percent is as follows: 0.58% $SiO_2$; 0.30% $Fe_2O_3$; 0.23% $Al_2O_3$; 0.75% CaO; 97.8% MgO; and 0.14% $B_2O_3$. The starting material has a CaO/$SiO_2$ weight ratio of 1.29, a loss on ignition of 0.19%, and contains a distribution of particle sizes to produce a closely packed mass. It contains 65% by weight of 14 × 35 mesh material and 35% of a fine fraction in which 80% by weight is minus 325 mesh.

The CaO/$SiO_2$ weight ratio of the fine fraction is increased to the amounts shown in Table I for each sample by addition of wollastonite ($CaSiO_3$) and $CaCO_3$ as −325 mesh particles. Sufficient −325 mesh fines of $Na_2CO_3$ are then added to the samples to provide one percent by weight of sodium on an oxide basis in each composition.

The compositions are shaped into cylinders 1 inch in height and 1⅛ inch in diameter and pressed at 15,000 psi and fired to 3170°F and held at that temperature for 3 hours.

Table I below shows the flux content of the fine fraction, the CaO/$SiO_2$ weight ratio of the fine fraction, green bulk density, fired bulk density, open porosity and 2800°F hot crushing strength of the compositions to which $Na_2O$ is added. The hot crushing strength reflects the force necessary to crush the fired cylinder when load is applied along the cylindrical axis. In Table I, the flux content reflects the weight percent of CaO and $SiO_2$ present in the fines.

TABLE I

| EX. NO. | GREEN BULK DENSITY | FIRED BULK DENSITY | % POROSITY | C/S RATIO | % FLUX CONTENT IN FINES | 2800°F HOT CRUSHING STRENGTH (PSI) |
|---|---|---|---|---|---|---|
| 1 | 2.84 | 2.83 | 18.9 | 1.29 | 1.33 | 1920 |

TABLE I – Continued

| EX. NO | GREEN BULK DENSITY | FIRED BULK DENSITY | % POROSITY | C/S RATIO | % FLUX CONTENT IN FINES | 2800°F HOT CRUSHING STRENGTH (PSI) |
|---|---|---|---|---|---|---|
| 3 | 2.82 | 2.80 | 19.8 | 2.5 | 4.0 | 5000+ |
| 4 | 2.84 | 2.80 | 19.6 | 3.0 | 4.0 | 4632+ |
| 5 | 2.83 | 2.80 | 19.8 | 3.5 | 4.0 | 5000+ |
| 6 | 2.81 | 2.78 | 20.2 | 4.0 | 4.0 | 4950+ |
| 7 | 2.82 | 2.79 | 20.1 | 4.5 | 4.0 | 4563+ |
| 8 | 2.83 | 2.80 | 19.7 | 5.0 | 4.0 | 4831+ |
| 9 | 2.85 | 2.82 | 19.4 | 2.0 | 4.5 | 4983+ |
| 10 | 2.80 | 2.77 | 20.7 | 2.5 | 4.5 | 4675+ |
| 11 | 2.81 | 2.77 | 20.7 | 3.0 | 4.5 | 4920+ |
| 12 | 2.79 | 2.80 | 19.8 | 3.5 | 4.5 | 4720+ |
| 13 | 2.80 | 2.76 | 20.9 | 4.0 | 4.5 | 4970+ |
| 14 | 2.81 | 2.76 | 20.8 | 4.5 | 4.5 | 4408+ |
| 15 | 2.82 | 2.77 | 20.5 | 5.0 | 4.5 | 4213+ |
| 16 | 2.76 | 2.76 | 21.2 | 2.0 | 5.0 | 4941+ |
| 17 | 2.77 | 2.75 | 21.4 | 2.5 | 5.0 | 4563+ |
| 18 | 2.75 | 2.74 | 21.8 | 3.0 | 5.0 | 5000+ |
| 19 | 2.75 | 2.74 | 21.8 | 3.5 | 5.0 | 4900+ |
| 20 | 2.75 | 2.74 | 21.7 | 4.0 | 5.0 | 4903+ |
| 21 | 2.78 | 2.74 | 21.5 | 4.5 | 5.0 | 4406+ |
| 22 | 2.79 | 2.75 | 21.3 | 5.0 | 5.0 | 4380+ |

Another series of refractory materials is prepared utilizing the techniques described above with respect to Examples 1–22 except that no sodium carbonate is added. The corresponding physical properties of the refractory materials produced in this series of control tests, without alkali metal addition, is shown in Table II below.

TABLE II

| CONTROL TEST NO. | GREEN BULK DENSITY | FIRED BULK DENSITY | % POROSITY | C/S RATIO | % FLUX CONTENT IN FINES | 2800°F HOT CRUSHING STRENGTH (PSI) |
|---|---|---|---|---|---|---|
| 1 | 2.82 | 2.86 | 18.0 | 1.29 | 1.33 | 600 |
| 2 | 2.80 | 2.84 | 19.0 | 2.0 | 4.0 | 530 |
| 3 | 2.80 | 2.82 | 19.2 | 2.5 | 4.0 | 600 |
| 4 | 2.79 | 2.82 | 19.5 | 3.0 | 4.0 | 2200 |
| 5 | 2.80 | 2.82 | 19.5 | 3.5 | 4.0 | 2550 |
| 6 | 2.80 | 2.82 | 20.0 | 4.0 | 4.0 | 2375 |
| 7 | 2.79 | 2.80 | 20.5 | 4.5 | 4.0 | 2750 |
| 8 | 2.79 | 2.81 | 20.1 | 5.0 | 4.0 | 3250 |
| 9 | 2.79 | 2.82 | 19.1 | 2.0 | 4.5 | 450 |
| 10 | 2.79 | 2.82 | 18.9 | 2.5 | 4.5 | 475 |
| 11 | 2.79 | 2.80 | 19.4 | 3.0 | 4.5 | 775 |
| 12 | 2.79 | 2.81 | 19.4 | 3.5 | 4.5 | 2200 |
| 13 | 2.79 | 2.81 | 19.8 | 4.0 | 4.5 | 2375 |
| 14 | 2.78 | 2.80 | 20.3 | 4.5 | 4.5 | 2375 |
| 15 | 2.79 | 2.80 | 19.7 | 5.0 | 4.5 | 2020 |
| 16 | 2.79 | 2.82 | 19.4 | 2.0 | 5.0 | 425 |
| 17 | 2.79 | 2.81 | 19.8 | 2.5 | 5.0 | 425 |
| 18 | 2.78 | 2.80 | 20.0 | 3.0 | 5.0 | 1800 |
| 19 | 2.79 | 2.80 | 20.6 | 3.5 | 5.0 | 2500 |
| 20 | 2.78 | 2.80 | 20.7 | 4.0 | 5.0 | 3150 |
| 21 | 2.78 | 2.78 | 20.8 | 4.5 | 5.0 | 1950 |
| 22 | 2.77 | 2.78 | 20.8 | 5.0 | 5.0 | 1450 |

The improvement in 2800°F hot crushing strength achieved through the incorporation of alkali metal oxides in the batch mix which is fired to produce magnesia refractories is dramatically shown by comparing the results of Examples 1–22 tabulated in Table I with the corresponding series of tests in which no alkali metal oxide was used, as shown in Table II. The hot crushing strength of the products produced by the invention is markedly greater than the control composition over the entire range of the tests. The strength increases by a factor of 10 at CaO/SiO$_2$ ratios between 2 and 3, and by a factor of about 2 at higher CaO/SiO$_2$ ratios.

The results of Examples 1–22 thus clearly demonstrate the production of high hot strength refractory compositions from magnesia grains having a high B$_2$O$_3$ content and a low CaO/SiO$_2$ mole ratio in accordance with the present invention.

The foregoing detailed description has been provided for clearness of understanding only, and no unnecessary limitations should be implied therefrom. Some modifications of the process and product described may be readily apparent to those skilled in the art.

What is claimed is:

1. A process of preparing a shaped magnesia refractory product, such as a brick, possessing good strength properties at elevated temperatures comprising:
    admixing (a) a low Fe$_2$O$_3$ and Al$_2$O$_3$ content magnesia grain starting material comprising 90 to 99% MgO, over 0.1% by weight B$_2$O$_3$ and having a Ca-Si mole ratio of less than 2.0 to 1; (b) fine particles of an alkali metal oxide or an alkali metal compound that decomposes to form an alkali metal oxide during firing; and (c) fine particles having an average particle size below about 100 mesh of a calcium-containing compound and, if necessary, of a silicon-containing compound, the amount of calcium-containing compound, and any silicon-containing compound added to the magnesia grain starting material being sufficient to increase the Ca-Si mole ratio of the particles below 100 mesh present in the composition to between 2 to 1 and 5 to 1, and to increase the total weight percent on an oxide basis of Ca plus Si of the particles below 100 mesh in the admixture to between 3 to 7% by weight;

forming the admixed composition to produce a shaped article; and firing the shaped article to produce a shaped product.

2. The process of claim 1 in which the materials admixed with the magnesia grain are all −325 mesh.

3. The process of claim 1 in which fine particles of wollastonite and $CaCO_3$ are added to the magnesia grain starting material as sources of silicon and calcium.

4. The process of claim 1 in which sodium carbonate is added to the magnesia grain starting material as a source of alkali metal.

5. The process of claim 3 in which sodium carbonate is added to the magnesia grain starting material as a source of alkali metal.

6. The process of claim 1 in which sufficient alkali metal-containing compound is admixed to provide 0.2–1% of sodium, on an oxide basis in the admixed composition.

7. The process of claim 1 in which the magnesia grain starting material contains about 98% by weight MgO.

* * * * *